(12) United States Patent
Chang et al.

(10) Patent No.: US 8,531,060 B2
(45) Date of Patent: Sep. 10, 2013

(54) PORTABLE ELECTRONIC DEVICE AND ADAPTER THEREOF

(75) Inventors: Tsang-Ming Chang, Taipei (TW); Yi-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 584 days.

(21) Appl. No.: 12/346,839

(22) Filed: Dec. 31, 2008

(65) Prior Publication Data

US 2010/0164301 A1   Jul. 1, 2010

(51) Int. Cl.
*H01H 83/00* (2006.01)

(52) U.S. Cl.
USPC .................. 307/125; 320/114; 320/141

(58) Field of Classification Search
USPC .................. 307/125; 320/114, 141
See application file for complete search history.

(56) References Cited

U.S. PATENT DOCUMENTS

| | | | |
|---|---|---|---|
| 6,195,271 | B1 | 2/2001 | Suzuki et al. |
| 2005/0168189 | A1 | 8/2005 | Schweigert |
| 2009/0206792 | A1* | 8/2009 | Hyatt ........................ 320/114 |

FOREIGN PATENT DOCUMENTS

| | | |
|---|---|---|
| JP | 08-179858 | 7/1996 |
| JP | 09-140126 | 5/1997 |
| JP | 11299092 | 10/1999 |
| JP | 2000102254 | 4/2000 |
| JP | 2000-308257 | 11/2000 |
| JP | 2001309656 | 11/2001 |
| JP | 2002-315319 | 10/2002 |
| WO | 2009102343 | 8/2009 |

OTHER PUBLICATIONS

"Office Action of German counterpart application", issued on Nov. 30, 2009, p1-p5.
"Office Action of Japan Counterpart Application", issued on Feb. 22, 2011, p1-p4, in which the listed references were cited.
"Office Action of Japan counterpart application", issued on Jul. 12, 2011, p1-p4, in which the listed references were cited.

* cited by examiner

*Primary Examiner* — Rexford Barnie
*Assistant Examiner* — Toan Vu
(74) *Attorney, Agent, or Firm* — Jianq Chyun IP Office (57) ABSTRACT

A portable electronic device is provided. The portable electronic device includes a system end and an adapter. The system end provides a trigger signal. The adapter converts an input AC voltage into an output DC voltage and provides the output DC voltage to the system end. When the adapter is connected to the system end, the trigger signal turns on the adapter. When the adapter is disconnected from the system end, the adapter detects an absence of the trigger signal and turns off automatically.

17 Claims, 8 Drawing Sheets

PORTABLE ELECTRONIC DEVICE AND ADAPTER THEREOF

BACKGROUND OF THE INVENTION

1. Field of the Invention

The present invention relates to a portable electronic device and its adapter. More particularly, the present invention relates to an adapter that turns on or turns off automatically according to connection and disconnection between the adapter and the system end of the portable electronic device.

2. Description of the Related Art

Portable electronic devices, such as personal digital assistants (PDAs) and notebook computers, as very popular due to their mobility, convenience, and versatile functions. Generally, a portable electronic device needs an adapter for providing electric power to the portable electronic device and/or charging the internal battery of the portable electronic device. Such a portable electronic device includes an adapter and a system end. The adapter converts the AC voltage of a wall socket into a DC voltage required by the system end. The system end is the main body of the portable electronic device, which is powered by the DC voltage and performs the versatile functions according to operations of the user.

A conventional adapter is always converting input AC voltage into output DC voltage as long as it is connected to a power source, such as a wall socket, even when it is disconnected from a corresponding system end. This AC/DC conversion consumes electric energy. The electric power consumed by an adapter when it is disconnected from its corresponding system end is called standby power consumption. Conventional adapters waste energy and generate unwanted heat because of their standby power consumption.

The U.S. Pat. No. 6,195,271 discloses an adapter that can reduce its standby power consumption when it is not providing electric power to the system end. This adapter includes two transformers. The first transformer provides the power to drive the system end. When the system end is shut down and does not need input power, the first transformer is turned off and the second transformer provides electric power to a part of the adapter to maintain on/off control of the power source. The adapter reduces its standby power consumption by turning off the first transformer. However, the adapter still consumes electric energy because the second transformer is still working.

SUMMARY OF THE INVENTION

Accordingly, the present invention is directed to a portable electronic device. When the adapter of the portable electronic device is connected to the system end of the portable electronic device, the system end turns on the adapter automatically. When the adapter is disconnected from the system end, the adapter turns off itself automatically. This automatic turn-off can reduce standby power consumption to the lowest possible level.

The present invention is also directed to an adapter of a portable electronic device. The adapter is turned on automatically when connected to the system end of the portable electronic device and is turned off automatically when disconnected from the system end. This automatic on/off control is very convenient to the user. The automatic on/off control also reduces standby power consumption to almost zero and prevents the adapter from overheat.

According to an embodiment of the present invention, a portable electronic device is provided. The portable electronic device includes a system end and an adapter. The system end provides a trigger signal. The adapter converts an input AC voltage into an output DC voltage and provides the output DC voltage to the system end. When the adapter is connected to the system end, the trigger signal turns on the adapter. When the adapter is disconnected from the system end, the adapter detects an absence of the trigger signal and turns off automatically.

The adapter may include a converter module, a controller switch, and a detection circuit. The converter module converts the input AC voltage into the output DC voltage and provides the output DC voltage to the system end. The controller switch is coupled to the converter module. The detection circuit is coupled to the controller switch for receiving the trigger signal. When the adapter is connected to the system end, the trigger signal turns on the detection circuit, the detection circuit turns on the controller switch, and then the controller switch turns on the converter module. When the adapter is disconnected from the system end, the detection circuit detects the absence of the trigger signal and outputs a disconnection signal. The controller switch turns off the converter module in response to the disconnection signal.

In some embodiments of the present invention, the controller switch may turn on the converter module when the detection circuit turns on the controller switch and the input AC voltage is higher than a predetermined level.

The adapter may include three connector pins. The converter module provides the output DC voltage through the first and the second connector pins. The detection circuit receives the trigger signal through the third connector pin.

Alternatively, the adapter may include only two connector pins. In this case, the converter module still provides the output DC voltage through the first and the second connector pins, but the detection circuit receives the trigger signal through the first or the second connector pin. One of the two connector pins supports two-way signal transmission.

The adapter may further include an override switch. The override switch may be coupled between the converter module and the controller switch. When the override switch is turned on, the override switch turns on the converter module. When the override switch is turned off, the override switch connects the converter module and the controller switch and just forwards the output of the controller switch to the converter module.

Alternatively, the override switch may be coupled only to the controller switch. When the override switch is turned on, the override switch turns on the controller switch and then the controller switch turns on the converter module.

Alternatively, the override switch may be coupled between the controller switch and the detection circuit. When the override switch is turned on, the override switch turns on the controller switch and then the controller switch turns on the converter module. When the override switch is turned off, the override switch connects the controller switch and the detection circuit and just forwards the output of the detection circuit to the controller switch.

The system end of the portable electronic device may include a trigger circuit and a power module. The trigger circuit provides the trigger signal. The power module is coupled to the trigger circuit for providing electric power to the trigger circuit so that the trigger circuit can generate the trigger signal.

According to another embodiment of the present invention, an adapter for a portable electronic device is provided. The adapter includes a converter module, a controller switch, and a detection circuit. The converter module converts an input AC voltage into an output DC voltage and provides the output DC voltage to a system end of the portable electronic device.

The controller switch is coupled to the converter module. The detection circuit is coupled to the controller switch for receiving a trigger signal provided by the system end. When the adapter is connected to the system end, the trigger signal turns on the detection circuit, the detection circuit turns on the controller switch, and then the controller switch turns on the converter module. When the adapter is disconnected from the system end, the detection circuit detects the absence of the trigger signal and outputs a disconnection signal. The controller switch turns off the converter module in response to the disconnection signal.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
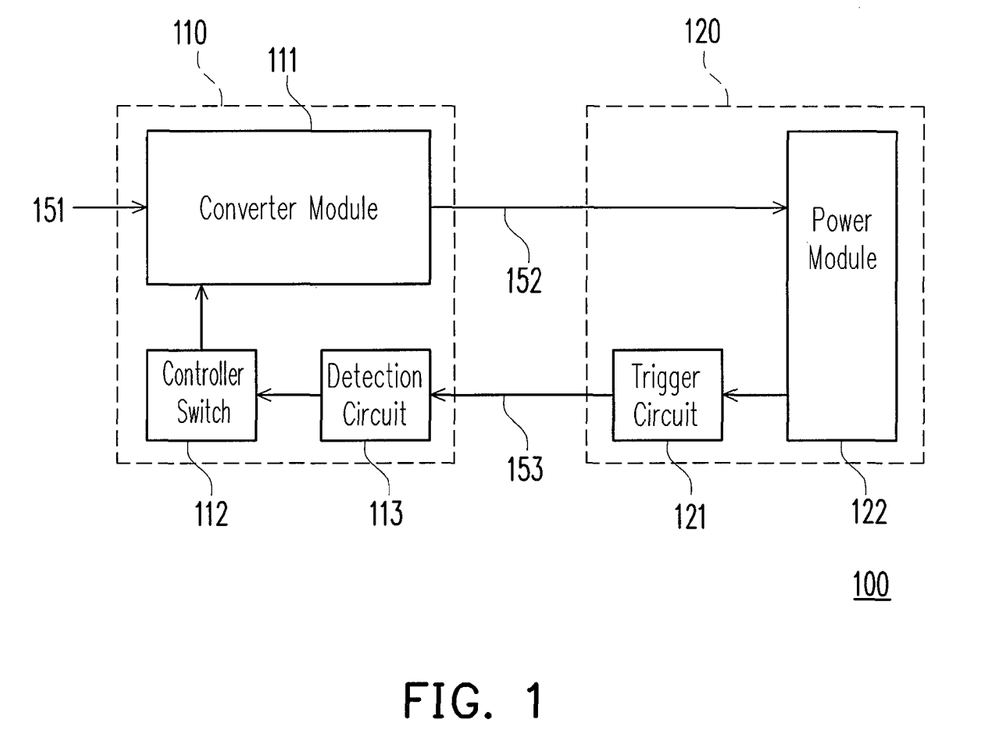
FIG. 1 is a schematic diagram showing a portable electronic device according to an embodiment of the present invention.

FIG. 1 is a schematic diagram showing a portable electronic device 100 according to an embodiment of the present invention. The portable electronic device 100 may be a notebook computer, a mobile phone, a PDA, etc. The portable electronic device 100 includes an adapter 110 and a system end 120. The adapter 110 converts an input AC voltage 151 into an output DC voltage 152 and provides the output DC voltage 152 to the system end 120. The system end 120 is the main body of the portable electronic device 100. The system end 120 receives the output DC voltage 152 and performs various functions of the portable electronic device 100. The system end 120 also provides a trigger signal 153 to the adapter 110 so that the adapter 110 can turn on and turn off automatically according to the physical connection between the adapter 110 and the system end 120.

When the adapter 110 is connected to the system end 120, the trigger signal 153 turns on the adapter 110 automatically. When the adapter 110 is disconnected from the system end 120, the adapter 110 detects the absence of the trigger signal 153 and turns off automatically. The trigger signal 153 may be an analog signal or a digital signal. For example, the trigger signal 153 may be transmitted through a connector pin from the system end 120 to the adapter 110 and the trigger signal 153 may be transmitted in the form of pulling the voltage of the connector pin to a predetermined voltage. When the adapter 110 is disconnected from the system end 120, the voltage of the connector pin drops to ground voltage and the adapter 110 turns off itself in response. Alternatively, the voltage of the connector pin may change to another predetermined voltage other than the ground voltage and the adaptor 110 may turn off itself in response. In other words, the trigger signal 153 is particular in a way that the adaptor recognizes the trigger signal and is able to differentiate the trigger signal from other incoming signals.

The adapter 110 includes a converter module 111, a controller switch 112, and a detection circuit 113. The converter module 111 converts the input AC voltage 151 into the output DC voltage 152 and provides the output DC voltage 152 to the system end 120. The controller switch 112 is coupled to the converter module 111. The detection circuit 113 is coupled to the controller switch 112 and receives the trigger signal 153. The power consumption of the converter module 111 predominates the total power consumption of the adapter 110. Therefore turning off the converter module 111 is equivalent to turning off the adapter 110. When the adapter 110 is connected to the system end 120, the trigger signal 153 turns on the detection circuit 113, the detection circuit 113 turns on the controller switch 112, and then the controller switch 112 turns on the converter module 111. When the adapter 110 is disconnected from the system end 120, the detection circuit 113 detects the absence of the trigger signal 153 and outputs a disconnection signal to the controller switch 112. The controller switch 112 turns off the converter module 111 in response to the disconnection signal.

The system end 120 includes a trigger circuit 121 and a power module 122. The trigger circuit 121 provides the trigger signal 153. The power module 122 is coupled to the trigger circuit 121 and provides electric power to the trigger circuit 121 so that the trigger circuit 121 can generate the trigger signal 153.

The controller switch 112 determines when to turn on the converter module 111. In some other embodiments of the present invention, the controller switch may turn on the converter module 111 only when the controller switch 112 is turned on by the detection circuit 113 and the input AC voltage 151 is higher than a predetermined level.

Figure 2A:
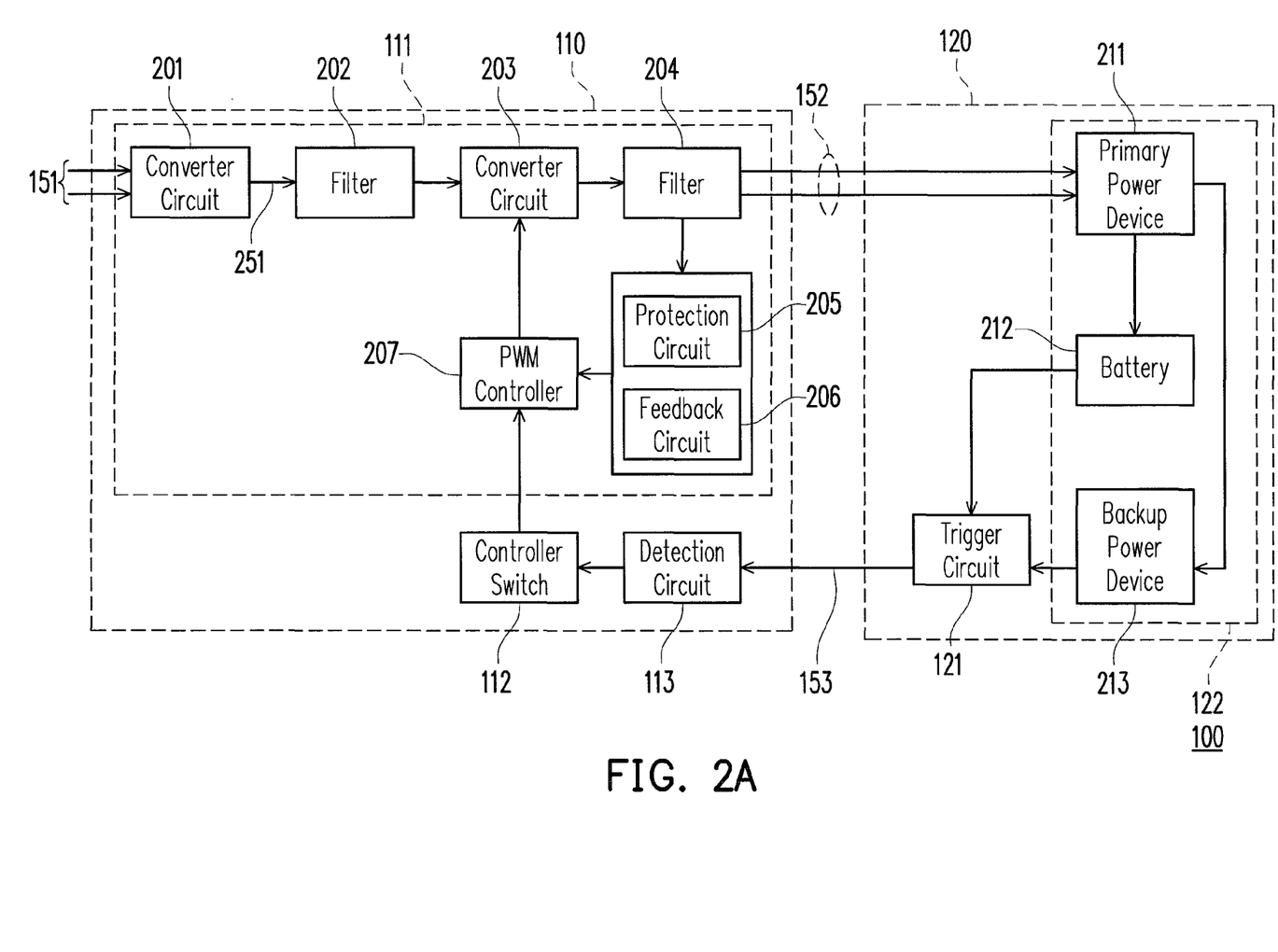
FIG. 2A and FIG. 2B are schematic diagrams showing other portable electronic devices according to other embodiments of the present invention.

FIG. 2A is a more detailed block diagram of the portable electronic device 100. The converter module 111 includes a converter circuit 201, a filter 202 coupled to the converter circuit 201, another converter circuit 203 coupled to the filter 202, another filter 204 coupled to the converter circuit 203, a pulse width modulation (PWM) controller 207 coupled between the converter circuit 203 and the controller switch 112, a protection circuit 205 coupled between the filter 204 and the PWM controller 207, and a feedback circuit 206 also coupled between the filter 204 and the PWM controller 207.

The converter circuit 201 converts the input AC voltage 151 into an internal DC voltage 251. For example, the converter circuit 201 may be a bridge rectifier. The filter 202 adjusts the waveform of the internal DC voltage 251. The converter circuit 203 converts the internal DC voltage 251 into the output DC voltage 152. The converter circuit 203 may be an isolated DC-DC converter or a buck converter, which converts the internal DC voltage 251 with a PWM mechanism. The isolated DC-DC converter may be a forward converter, half bridge converter, full bridge converter, push-pull converter or flyback converter, etc. The output DC voltage 152 is lower than the internal DC voltage 251. The filter 204 adjusts the waveform of the output DC voltage 152. The feedback circuit 206 provides a feedback signal to the PWM controller 207 according to the output DC voltage 152. The PWM controller 207 controls the PWM mechanism of the converter circuit 203 according to the feedback signal. The protection circuit 205 turns off the PWM controller 207 when voltage or current output by the adapter 110 exceeds a predetermined level in order to protect the adapter 110 from overhigh voltage or current.

The adapter 110 includes three connector pins for connecting with the system end 120. The converter module 111 provides the output DC voltage 152 through the first and the second connector pins. The detection circuit 113 receives the trigger signal 153 through the third connector pin.

The power module 122 of the system end 120 includes a battery 212 coupled to the trigger circuit 121, a backup power device 213 coupled to the trigger circuit 121, and a primary power device 211 coupled to the battery 212 and the backup power device 213. The electric power required by the trigger circuit 121 to generate the trigger signal 153 may be provided by either the battery 212 or the backup power device 213. For example, the portable electronic device 100 may be a notebook computer. The battery 212 may be the main battery of the notebook computer and the backup power device 213 may be the real-time clock (RTC) battery of the notebook computer. The primary power device 211 receives the output DC voltage 152 and converts the output DC voltage 152 into another DC or AC voltage in order to provide electric power to the system end 120. The primary power device 211 also charges the battery 212 and the backup power device 213.

Figure 2B:
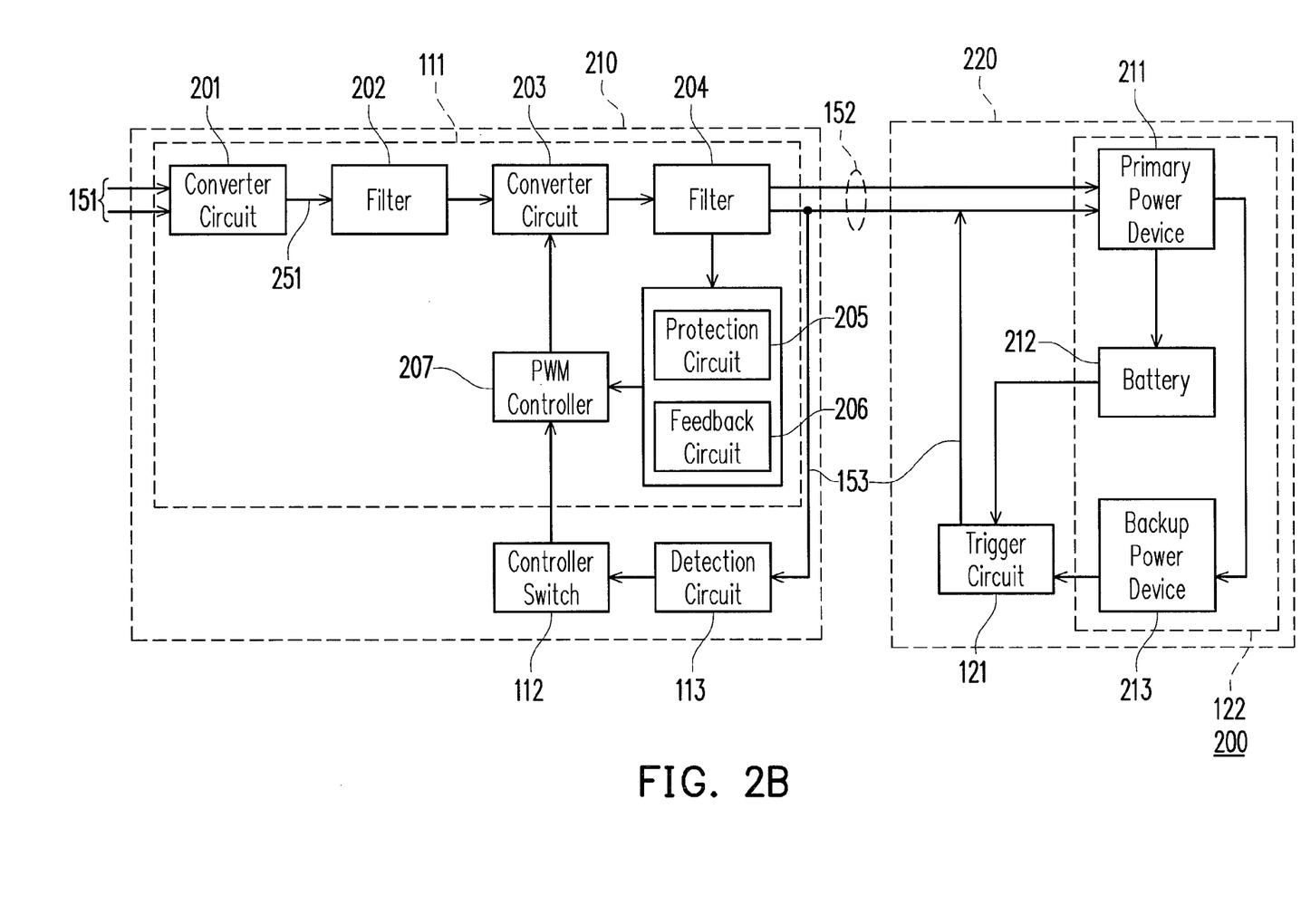

FIG. 2B is a detailed block diagram of another portable electronic device 200 according to another embodiment of the invention. The portable electronic device 200 is similar to the portable electronic device 100 shown in FIG. 2A with the following differences. Unlike the portable electronic device 100 of FIG. 2A, the adaptor 210 of the portable electronic device 200 includes two pins instead of three pins for connecting with the system end 220. The converter module 111 provides the output DC voltage 152 through the first and the second connector pins. The detection circuit 113 receives the trigger signal 153 provided by the trigger circuit 121 through the first or the second connector pin, as shown in FIG. 2B. In other words, one of the two connector pins transmits signals in both directions and is used as a passage for the trigger signal 153. Although a closed loop is formed in the adaptor 210 when the adapter 210 disconnects from the system end 220, the detection circuit 113 still detects an absence of the trigger signal 153 because the trigger signal 153 is different from the output DC voltage 152.

Figure 3:
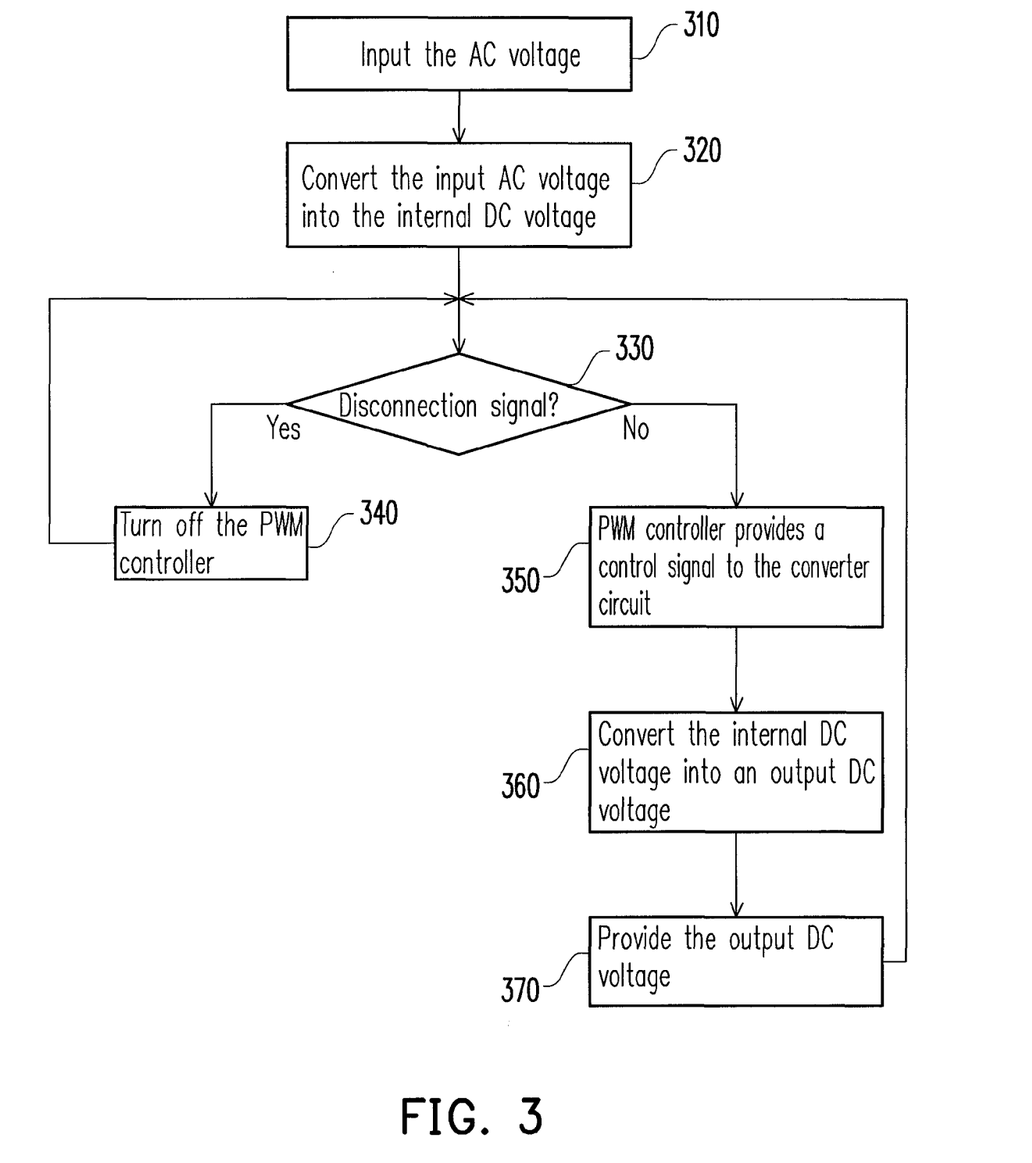
FIG. 3 and FIG. 4 are flow charts showing the operation of the portable electronic devices in FIG. 2A and FIG. 2B.

FIG. 3 is the flow chart of the operation of the portable electronic device 100 when the adapter 110 is disconnected from the system end 120. FIG. 3 is also the flow chart of the operation of the portable electronic device 200 when the adapter 210 is disconnected from the system end 220. First, the AC voltage 151 is input into the converter circuit 201 (step 310). The converter circuit 201 converts the input AC voltage 151 into the internal DC voltage 251 and then the filter 202 adjusts the waveform of the internal DC voltage 251 (step 320). The controller switch 112 checks whether the detection circuit 113 outputs a disconnection signal or not (step 330). When the adapter 110 is still connected to the system end 120, the detection circuit 113 receives the trigger signal 153 from the trigger circuit 121 and does not output the disconnection signal. Consequently, the flow proceeds to step 350. The PWM controller 207 provides a control signal to the converter circuit 203 to control the PWM mechanism (step 350). The converter circuit 203 converts the internal DC voltage 251 into the output DC voltage 152 and then the filter 204 adjusts the waveform of the output DC voltage 152 (step 360). The filter 204 provides the output DC voltage 152 to the system end 120 (step 370). Next, the flow returns to step 330.

When the adapter 110 is disconnected from the system end 120, the detection circuit 113 detects the absence of the trigger signal 153 and outputs the disconnection signal to the controller switch 112. The controller switch 112 detects the disconnection signal (step 330) and turns off the PWM controller 207 in response (step 340). The power consumption of the PWM mechanism of the converter circuit 203 predominates the power consumption of the converter module 111. When the PWM controller 207 is turned off, the PWM mechanism stops. Therefore turning off the PWM controller 207 is equivalent to turning off the converter module 111 and is also equivalent to turning off the entire adapter 110. Next, the flow returns to step 330.

Figure 4:
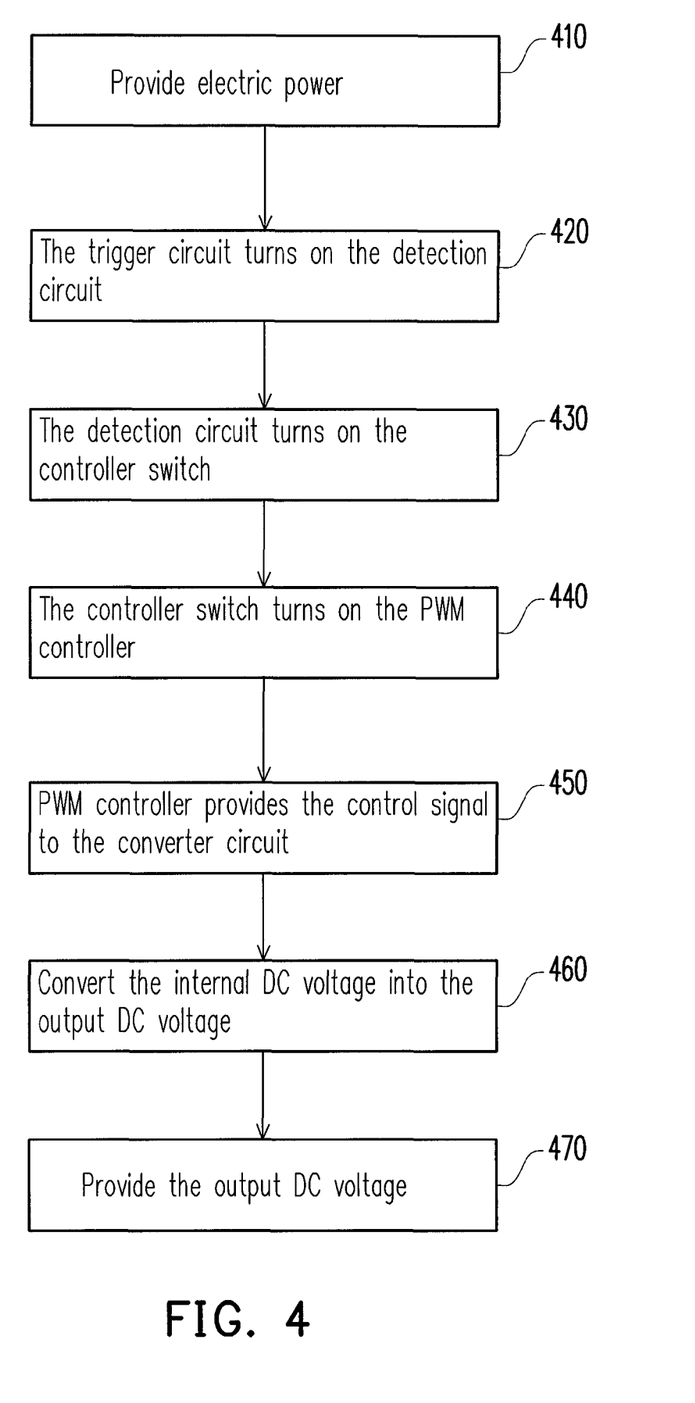

FIG. 4 is the flow chart of the operation of the portable electronic device 100 when the adapter 110 is connected to the system end 120. FIG. 4 is also the flow chart of the operation of the portable electronic device 200 when the adapter 210 is connected to the system end 220. First, the battery 212 or the backup power device 213 provides electric power to the trigger circuit 121 (step 410). The trigger circuit 121 outputs the trigger signal 153 to the detection circuit 113 and the trigger signal 153 turns on the detection circuit 113 (step 420). The detection circuit 113 turns on the controller switch 112 (step 430). In response, the controller switch 112 turns on the PWM controller 207 (step 440). The PWM controller 207 provides the control signal to the converter circuit 203 to control the PWM mechanism (step 450). The converter circuit 203 converts the internal DC voltage 251 into the output DC voltage 152 and then the filter 204 adjusts the waveform of the output DC voltage 152 (step 460). The filter 204 provides the output DC voltage 152 to the system end 120 (step 470).

When the adapter 110 is disconnected from the system end 120, the adapter 110 is turned off. Only the trigger signal 153 provided by the system end 120 can turn on the adapter 110. The trigger signal 153 is powered by the battery 212 or the backup power device 213. If both the battery 212 and the backup power device 213 are damaged or the electric energy of both the battery 212 and the backup power device 213 are exhausted, the trigger signal 153 cannot be generated to awaken the adapter 110. If the system end is a conventional one that does not provide the trigger signal, there is no way to turn on the adapter 110. In order to cope with such cases, the adapter 110 needs a way to be turned on manually.

Figure 5:
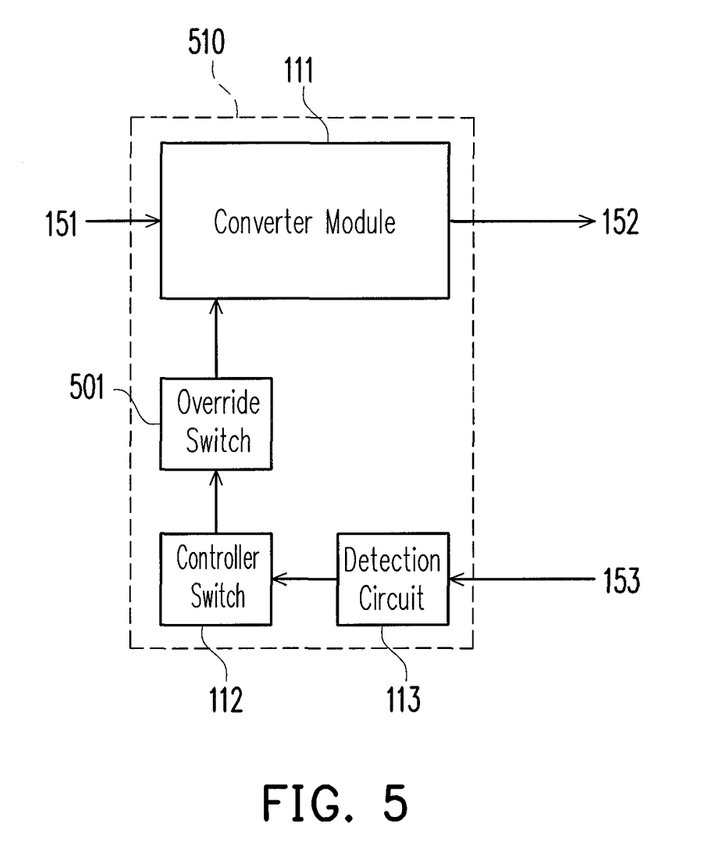
FIG. 5, FIG. 6, and FIG. 7 are schematic diagrams showing adapters of portable electronic devices according to various embodiments of the present invention.

FIG. 5 is a schematic diagram showing an adapter 510 of a portable electronic device according to another embodiment of the present invention. The difference between the adapter 110 in FIG. 1 and the adapter 510 in FIG. 5 is the override switch 501 included in the adapter 510. The override switch 501 is coupled between the converter module 111 and the controller switch 112. When the override switch 501 is turned on by the user of the portable electronic device, the override switch 501 turns on the converter module 111 regardless of the presence or absence of the trigger signal 153. When the override switch 501 is turned off by the user, the override switch 501 simply connects the converter module 111 and the controller switch 112 and forwards the output of the controller switch 112 to the converter module 111. When the override switch 501 is turned off, the adapter 510 works in exactly the same way as the adapter 110 does.

Figure 6:
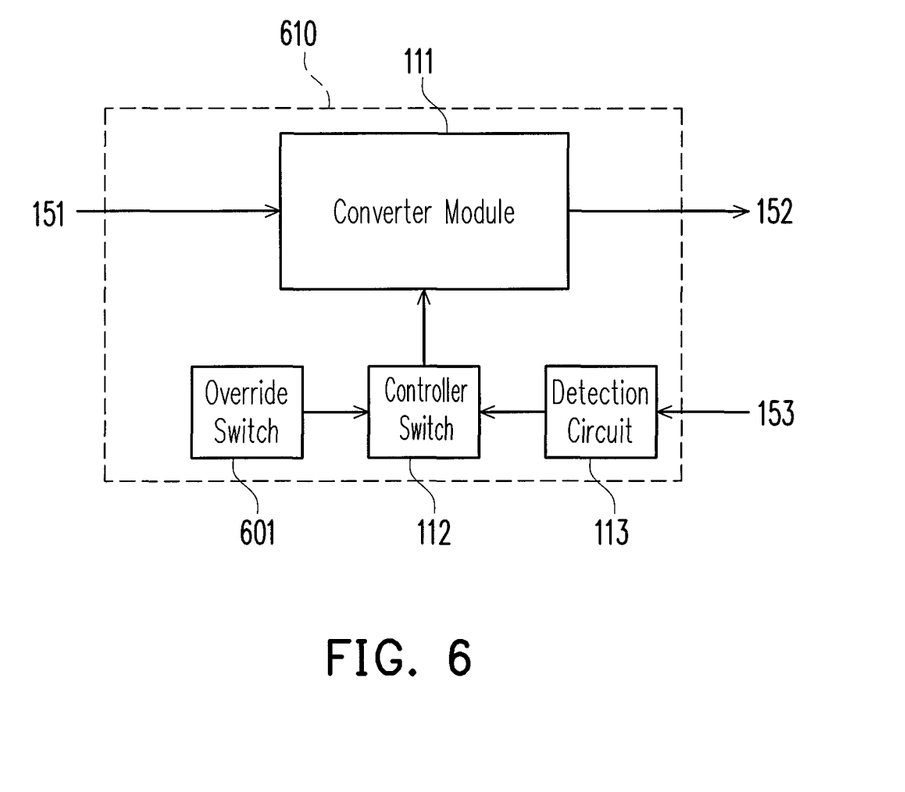

FIG. 6 is a schematic diagram showing an adapter 610 of a portable electronic device according to another embodiment of the present invention. The difference between the adapter 110 in FIG. 1 and the adapter 610 in FIG. 6 is the override switch 601 included in the adapter 610. The override switch 601 is coupled to the controller switch 112. When the override switch 601 is turned on by the user, the override switch 601 turns on the controller switch 112 and then the controller switch 112 turns on the converter module 111. Therefore the adapter 610 can be turned on manually regardless of the presence or absence of the trigger signal 153. When the override switch 601 is turned off, the adapter 610 works in exactly the same way as the adapter 110 does.

Figure 7:
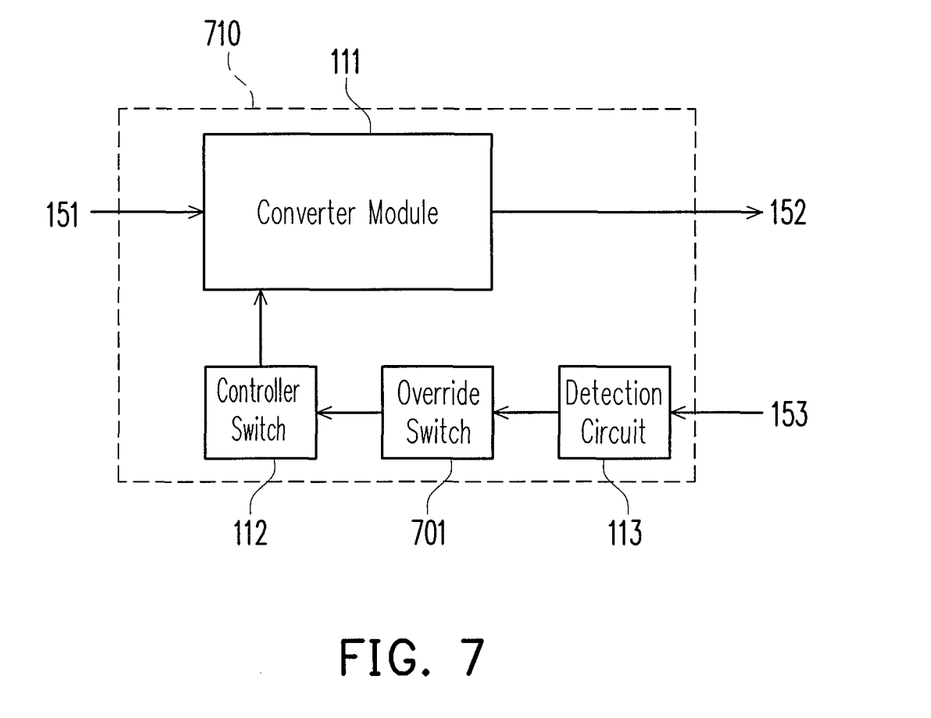

FIG. 7 is a schematic diagram showing an adapter 710 of a portable electronic device according to still another embodiment of the present invention. The difference between the adapter 110 in FIG. 1 and the adapter 710 in FIG. 7 is the override switch 701 included in the adapter 710. The override switch 701 is coupled between the controller switch 112 and the detection circuit 113. When the override switch 701 is turned on by the user, the override switch 701 turns on the controller switch 112 and then the controller switch 112 turns on the converter module 111. Therefore the adapter 710 can be turned on manually regardless of the presence or absence of the trigger signal 153. When the override switch 701 is turned off by the user, the override switch 701 simply connects the controller switch 112 and the detection circuit 113 and forwards the output of the detection circuit 113 to the controller switch 112. When the override switch 701 is turned off, the adapter 710 works in exactly the same way as the adapter 110 does.

In summary, the adapter proposed by the present invention is turned on automatically when it is connected to the system end and turns itself off automatically when it is disconnected from the system end. This automatic on/off control effectively reduces standby power consumption of the adapter. When the adapter is turned off, it relies on the trigger signal from the system end to be awakened. The adapter does not have to awaken itself. Therefore the adapter can be turned off completely, which reduces its standby power consumption to virtually zero. In some embodiments of the present invention, the adapter can be turned on manually through an override switch so that the adapter is compatible with conventional system end. In addition, the override switch can be used to turn on the adapter when the system end cannot provide the trigger signal due to malfunction or exhaustion of electric energy stored in the power module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable electronic device, comprising: a system end including a backup power device and a battery for providing a trigger signal, wherein the battery and the backup power device is coupled to a trigger circuit and the trigger signal is provided by the backup power device, and the system end comprises:

the trigger circuit for providing the trigger signal; and
a power module coupled to the trigger circuit for providing electric power to the trigger circuit, wherein the battery is in the power module;
wherein the backup power device coupled to the trigger circuit for providing electric power to the trigger circuit;
wherein the power module further comprises: a primary power device coupled to the backup power device for receiving the output DC voltage, providing electric power to the system end, and charging the backup power device; and
an adapter for converting an input AC voltage into an output DC voltage and providing the output DC voltage to the system end;

when the adapter is connected to the system end, the trigger signal turns on the adapter;
when the adapter is disconnected from the system end, the adapter detects an absence of the trigger signal and turns off.

2. The portable electronic device of claim 1, wherein the adapter comprises:

a converter module for converting the input AC voltage into the output DC voltage and providing the output DC voltage to the system end;
a controller switch coupled to the converter module; and
a detection circuit coupled to the controller switch for receiving the trigger signal; wherein
when the adapter is connected to the system end, the trigger signal turns on the detection circuit, the detection circuit turns on the controller switch, and then the controller switch turns on the converter module;
when the adapter is disconnected from the system end, the detection circuit detects the absence of the trigger signal and outputs a disconnection signal, the controller switch turns off the converter module in response to the disconnection signal.

3. The portable electronic device of claim 2, wherein the controller switch turns on the converter module when the detection circuit turns on the controller switch and the input AC voltage is higher than a predetermined level.

4. The portable electronic device of claim 2, wherein the adapter further comprises a first connector pin, a second connector pin, and a third connector pin, the converter module provides the output DC voltage through the first and the second connector pins, the detection circuit receives the trigger signal through the third connector pin.

5. The portable electronic device of claim 2, wherein the adapter further comprises a first connector pin and a second connector pin, the converter module provides the output DC voltage through the first and the second connector pins, the detection circuit receives the trigger signal through the first or the second connector pin.

6. The portable electronic device of claim 2, wherein the adapter further comprises:

an override switch coupled between the converter module and the controller switch, wherein, when the override switch is turned on, the override switch turns on the converter module; when the override switch is turned off, the override switch connects the converter module and the controller switch.

7. The portable electronic device of claim 2, wherein the adapter further comprises:

an override switch coupled to the controller switch, wherein, when the override switch is turned on, the override switch turns on the controller switch and then the controller switch turns on the converter module.

8. The portable electronic device of claim 2, wherein the adapter further comprises:

an override switch coupled between the controller switch and the detection circuit, wherein, when the override switch is turned on, the override switch turns on the controller switch and then the controller switch turns on the converter module; when the override switch is turned off, the override switch connects the controller switch and the detection circuit.

9. The portable electronic device of claim 2, wherein the converter module comprises:

a first converter circuit for converting the input AC voltage into an internal DC voltage;

a second converter circuit coupled to the first converter circuit for converting the internal DC voltage into the output DC voltage;

a feedback circuit coupled to the second converter circuit for providing a feedback signal according to the output DC voltage; and a PWM controller coupled between the second converter circuit and the feedback circuit for controlling the second converter circuit according to the feedback signal;

wherein the controller switch turns on the PWM controller when the controller switch is turned on and the controller switch turns off the PWM controller in response to the disconnection signal.

10. The portable electronic device of claim 9, wherein the converter module further comprises:

a first filter coupled between the first converter circuit and the second converter circuit for adjusting waveform of the internal DC voltage;

a second filter coupled to the second converter circuit for adjusting waveform of the output DC voltage; and a protection circuit coupled between the second filter and the PWM controller for turning off the PWM controller when voltage or current provided by the adapter exceeds a predetermined level.

11. The portable electronic device of claim 1, wherein the power module further comprises:

a primary power device coupled to the battery for receiving the output DC voltage, providing electric power to the system end, and charging the battery.

12. An adapter for a portable electronic device, comprising:

a converter module for converting an input AC voltage into an output DC voltage and providing the output DC voltage to a system end of the portable electronic device;

a controller switch coupled to the converter module; and a detection circuit coupled to the controller switch for receiving a trigger signal provided by the system end; wherein when the adapter is connected to the system end, the trigger signal turns on the detection circuit, the detection circuit turns on the controller switch, and then the controller switch turns on a PWM controller of the converter module to turn on the converter module;

an override switch coupled between the converter module and the controller switch directly, wherein, when the override switch is turned on, the override switch turns on the converter module; when the override switch is turned off, the override switch connects the converter module and the controller switch;

when the adapter is disconnected from the system end, the detection circuit detects the absence of the trigger signal and outputs a disconnection signal, the controller switch turns off the PWM controller to turn off the converter module in response to the disconnection signal; and when the adapter is connected to an AC source, the input AC voltage is coupled to the converter module when the converter module is turned on or when the converter module is turned off; and when the override switch is turned on by the user of the portable electronic device, the override switch turns on the converter module regardless of the presence or absence of the trigger signal.

13. The adapter of claim 12, wherein the controller switch turns on the converter module when the detection circuit turns on the controller switch and the input AC voltage is higher than a predetermined level.

14. The adapter of claim 12, further comprising a first connector pin, a second connector pin, and a third connector pin, wherein the converter module provides the output DC voltage through the first and the second connector pins, the detection circuit receives the trigger signal through the third connector pin.

15. The adapter of claim 12, further comprising a first connector pin and a second connector pin, wherein the converter module provides the output DC voltage through the first and the second connector pins, the detection circuit receives the trigger signal through the first or the second connector pin.

16. The adapter of claim 12, wherein the converter module comprises:

a first converter circuit for converting the input AC voltage into an internal DC voltage;

a second converter circuit coupled to the first converter circuit for converting the internal DC voltage into the output DC voltage;

a feedback circuit coupled to the second converter circuit for providing a feedback signal according to the output DC voltage; and wherein the PWM controller is coupled between the second converter circuit and the feedback circuit for controlling the second converter circuit according to the feedback signal.

17. The adapter of claim 16, wherein the converter module further comprises:

a first filter coupled between the first converter circuit and the second converter circuit for adjusting waveform of the internal DC voltage;

a second filter coupled to the second converter circuit for adjusting waveform of the output DC voltage; and a protection circuit coupled between the second filter and the PWM controller for turning off the PWM controller when voltage or current provided by the adapter exceeds a predetermined level.

* * * * *